(12) United States Patent
Rea et al.

(10) Patent No.: US 7,242,293 B2
(45) Date of Patent: Jul. 10, 2007

(54) RADIO-FREQUENCY IDENTIFICATION APPARATUS, SYSTEMS, AND METHODS

(75) Inventors: Adam D. Rea, Suquamish, WA (US); Sunny Consolvo, Seattle, WA (US); Kenneth P. Fishkin, Seattle, WA (US); Ian E. Smith, Seattle, WA (US)

(73) Assignee: Intel Corporation, Santa Clara, CA (US)

(\*) Notice: Subject to any disclaimer, the term of this patent is extended or adjusted under 35 U.S.C. 154(b) by 172 days.

(21) Appl. No.: 11/018,570

(22) Filed: Dec. 21, 2004

(65) Prior Publication Data

US 2007/0120682 A1    May 31, 2007

(51) Int. Cl.
*G08B 1/08* (2006.01)
*G08C 19/00* (2006.01)

(52) U.S. Cl. ............... 340/539.11; 340/572.1; 340/572.7; 340/572.8; 2/159; 235/462.44; 702/94

(58) Field of Classification Search ........... 340/539.11, 340/572.1, 572.2, 572.4, 572.5, 572.7, 573.1, 340/686.1; 702/94, 150; 235/462.44, 462.45; 463/37; 2/159
See application file for complete search history.

(56) References Cited

U.S. PATENT DOCUMENTS

| | | | | |
|---|---|---|---|---|
| 5,592,401 | A  * | 1/1997 | Kramer ...................... | 702/153 |
| 6,842,116 | B2 * | 1/2005 | Hum et al. ............... | 340/573.4 |
| 6,850,162 | B2 * | 2/2005 | Cacioli et al. ........... | 340/573.1 |
| 7,031,803 | B2 * | 4/2006 | Eneau et al. ................ | 700/225 |
| 7,034,685 | B2 * | 4/2006 | Fabre et al. ............. | 340/572.1 |

\* cited by examiner

*Primary Examiner*—Davetta W. Goins
(74) *Attorney, Agent, or Firm*—Schwegman, Lundberg, Woessner & Kluth, P.A.

(57) ABSTRACT

Apparatus and systems, as well as methods and articles, may operate to identify and locate an RFID-tagged object relative to a point on a body, including a human, animal, or robotic body.

26 Claims, 3 Drawing Sheets

RADIO-FREQUENCY IDENTIFICATION APPARATUS, SYSTEMS, AND METHODS

TECHNICAL FIELD

Various embodiments described herein relate to identification techniques generally, including apparatus, systems, and methods employing radio-frequency signals to identify objects and characteristics of objects.

BACKGROUND INFORMATION

Radio-frequency identification (RFID) techniques may include transmitting an RF interrogation signal from an RFID reader to an object previously associated with identification data stored in a memory on or within the object as an RFID "tag." The tag may respond to the interrogation by returning an RF signal modulated with the identification data. A passive RFID tag may derive operational power to receive and process the interrogation signal, and/or to transmit the response, from an RF field created by the reader as a consequence of the interrogation transmission. An RFID system may thus operate to communicate information, including the identification of objects present within an operational range of an RFID reader.

For more information about RFID, see e.g. International Standards Organization (ISO) Standard 18000, "Information Technology—AIDC Techniques—RFID for Item Management—Air Interface" developed by Working Group 4 of Subcommittee 31 of ISO Joint Technical Committee 1 (ISO/IEC JTC 1/SC31), "Automatic Identification and Data Capture Techniques, Radio Frequency Identification."

DETAILED DESCRIPTION

In addition to identifying objects present within a particular area of operation, various embodiments disclosed herein may operate to locate an RFID-tagged object relative to a point on a body, including a human, animal, or robotic body, for example.

Figure 1:
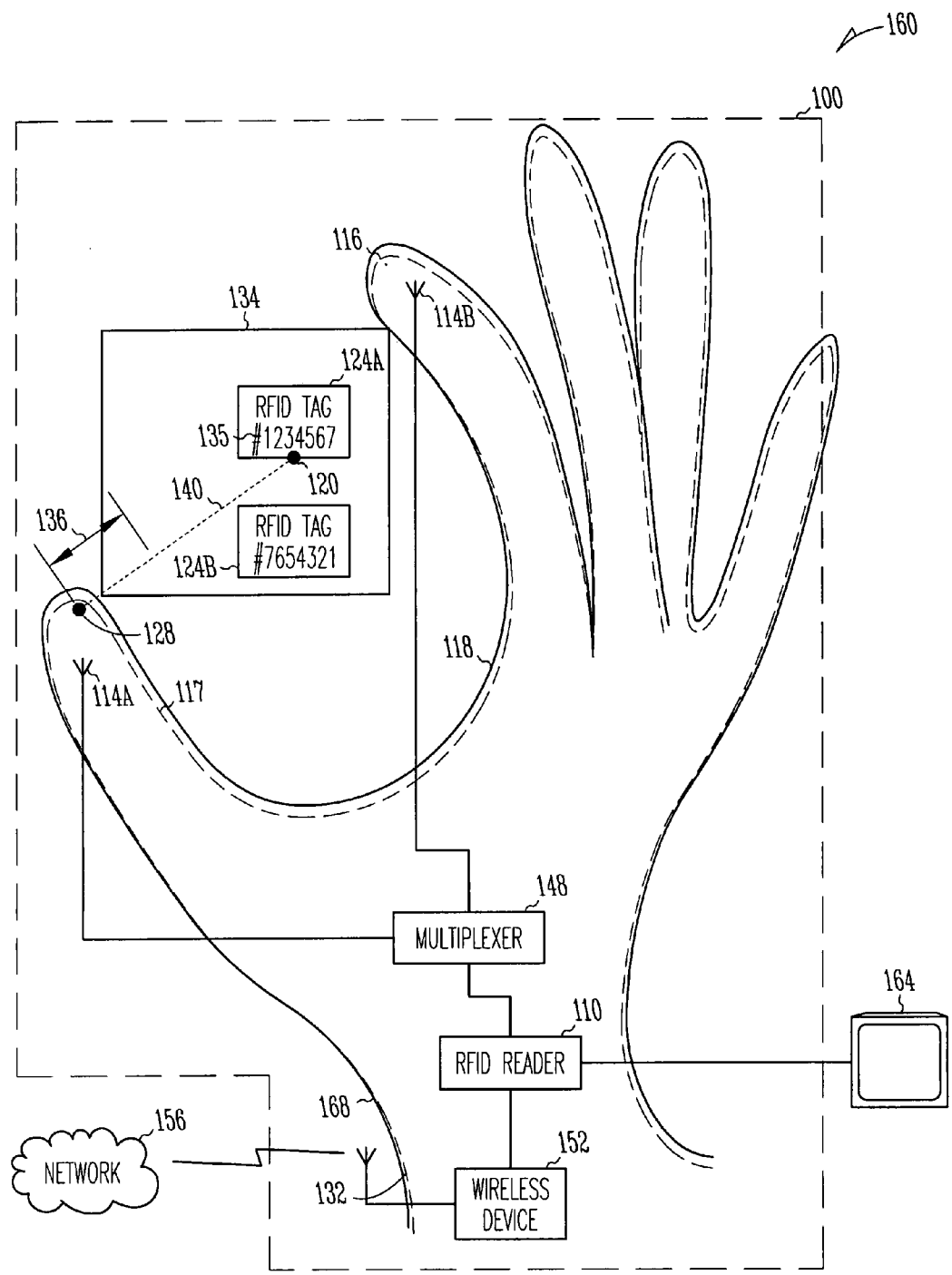
FIG. 1 is a block diagram of an apparatus and a system according to various embodiments of the invention.

FIG. 1 comprises a block diagram of an apparatus 100 and a system 160 according to various embodiments of the invention. The apparatus 100 may include a wearable RFID reader 110, as well as two or more antennas 114A, 114B coupled to the RFID reader 110. The wearable RFID reader 110 may be incorporated into, or attached to an article of clothing, including perhaps a glove, a shoe, or a vest. The antennas 114A, 114B may be positioned on a finger 116, a thumb 117, or a palm 118, for example, to distinguish a location 120 of an RFID tag 124A relative to a selected location 128 on a body 132 bearing the RFID reader 110. The antennas 114A, 114B may comprise monopole, dipole, omnidirectional, beam, patch, and others types, as well as combinations of these.

In some embodiments of the apparatus 100, the tag 124A may be attached to, embedded in, and/or associated with an object 134, to identify the object 134 according to identification data 135 stored in the tag 124A. The apparatus 100 may also be capable of recognizing that the object 134 is being manipulated by one or more digits, limbs, portions of limbs, and/or other areas associated with the body 132 (e.g., the finger 116, thumb 117, or palm 118). If more than one tag 124A, 124B is associated with the object 134, the apparatus 100 may be capable of determining which tag 124A, 124B is closest to the selected location 128 at a particular time, including a time during a period when the object 134 is being manipulated. If multiple objects 134 include identifying tags, the apparatus 100 may be able to determine which one of the objects 134 is closest to the selected location 128.

In some embodiments of the apparatus 100, the identification data 135 may be selected at a time prior to reading the RFID tag 124A. For example, an identification number may be extracted from a database and used to confirm that a particular tag 124A, possibly one associated with a selected group of tags, is being manipulated by the body 132. An apparatus 100 worn by a human toddler, for example, may operate to alert a caretaker that the toddler is within a selected distance of a dangerous, RFID-tagged substance such as a poison or cleaning fluid listed in the database.

Since the apparatus 100 may be used to distinguish the object 134 from other objects of various shapes and sizes, and to differentiate between areas of a multi-tagged object, it may be desirable to select a resolution 136 associated with a tag-reading operation. Thus, the location 120 of the RFID tag 124A relative to the selected location 128 may be resolved to a distance of approximately 0.25 centimeters to 25 centimeters along a substantially straight line 140 between the RFID tag location 120 and the selected location 128.

The apparatus 100 may also include a multiplexer 148 coupled to the RFID reader 110 to select an antenna from the two or more antennas 114A, 114B. The apparatus 100 may further include a wireless device 152, perhaps comprising a transceiver, coupled to the RFID reader 110 to communicate with a data network 156, perhaps according to an Institute of Electrical and Electronic Engineers (IEEE) 802.11 standard. For further information regarding 802.11 standards, please consult "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments. Other embodiments may be realized.

A system 160 may include one or more apparatus 100, perhaps comprising a wearable RFID reader 110 as well as one or more antennas 114A, 114B coupled to the RFID reader 110 and positioned to distinguish the location 120 of an RFID tag 124A relative to a selected location 128 on a body 132, as previously mentioned. The system 160 may also include a display 164 coupled to the RFID reader 110, either directly or remotely across a network, for example. The display 164 may comprise a simple liquid crystal display, a flat panel display, a cathode-ray tube, or a holographic display, among others. The system 160 may further include a garment for attaching the antennas 114A, 114B to the body 132, including perhaps a glove 168 or a shoe to attach the antennas 114A, 114B to a hand or foot, respectively.

In some embodiments of the system 160, the antenna design, transmit power level, transmit frequency and/or phase shift between the transmitted and received signals may operate to determine a selectable location distinguishing resolution 136 along a substantially straight line 140 between the RFID tag location 120 and the selected location 128. The selectable resolution 136 may be useful in order to distinguish relatively larger objects during a first time period and smaller objects during a second time period, for example.

Consider an assembly-line operator searching for a particular printed-circuit board in a pile of boards, as an activity in a process. It may be desirable to read a board-identification tag using a lower resolution when the operator grasps a board from the pile. After the board is selected, the process may call for reading tags associated with individual integrated circuit packages on the board using a higher resolution, as the operator points to each package, for example. Thus, a read operation performed at a resolution suitable to the package identification activity may produce undesirable results if used for board selection. A read operation conducted at high resolution during the board-selection process might, on the other hand, capture an integrated circuit identification instead of the desired board identification.

The apparatus 100; RFID reader 110; antennas 114A, 114B; finger 116; thumb 117; palm 118; locations 120, 128; RFID tags 124A, 124B; identification data 135; body 132; distance 136; line 140; multiplexer 148; wireless device 152; data network 156; system 160; display 164; and glove 168 may all be characterized as "modules" herein.

Such modules may include hardware circuitry, single and/or multi-processor circuits, memory circuits, software program modules and objects, and/or firmware and combinations thereof, as desired by the architect of the apparatus 100 and system 160 and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than RFID close-proximity read operations; thus, various embodiments are not to be so limited. The illustrations of apparatus 100 and systems 160 are intended to provide a general understanding of the structure of various embodiments, and are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single and/or multi-processor modules, single and/or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
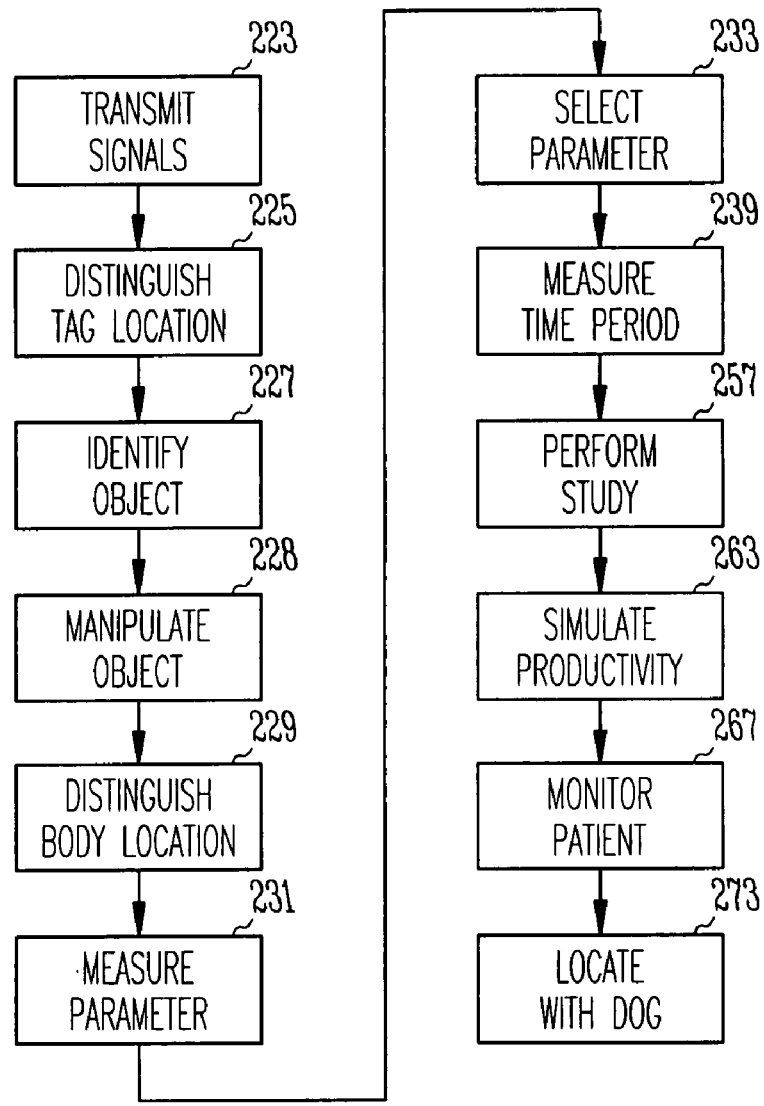
FIG. 2 is a flow diagram illustrating several methods according to various embodiments of the invention.

FIG. 2 is a flow diagram illustrating several methods 211 according to various embodiments of the invention. A method 211 may begin at block 223 by transmitting signals from one or more antennas, including signals comprising a plurality of frequencies within a range of approximately 1 megahertz to 30 gigahertz. The method 211 may continue at block 225 with distinguishing one or more locations associated with an RFID tag relative to a selected location on a body (e.g., a human body, an animal body, or a robotic body, among others), using a wearable RFID reader connected to the antennas.

The method 211 may also include identifying an object coupled to the RFID tag according to data stored in the tag, at block 227. The method 211 may further include manipulating the object using one or more of a digit, a limb, or a portion of a limb associated with the body, at block 228. The method 211 may continue with distinguishing a finger, a thumb, a palm and/or other body location operating to manipulate the object attached to the RFID tag, at block 229.

The method 211 may include measuring a parameter associated with a return signal from the RFID tag, including, for example, a signal strength, a phase shift relative to the phase of the transmitted signal, or a frequency associated with a spectral component, to determine the RFID tag location, at block 231. Method 211 may also include selecting the parameter and/or a value determined by measuring the parameter, to determine a resolution associated with the RFID tag location along a line between the RFID tag location and the selected location on the body, at block 233. Selectable resolution techniques may be useful for switching between an RFID context involving object identification and a context involving location identification, such as the identification of specific locations on or within the object, for example. Many embodiments may be realized.

The method 211 may further include measuring a time period between sensing locations associated with the RFID tag, at block 239. In some embodiments, the method 211 may include utilizing a computer to analyze the time period and the locations, perhaps to perform a human productivity time and motion study, at block 257. In some embodiments, the method 211 may comprise sensing the RFID tag relative to a location on a multi-digit robot (e.g., to simulate human productivity), at block 263, and/or employing the time period and the locations associated with the RFID tag to monitor patient medical equipment utilization, at block 267. The method 211 may conclude at block 273 with determining the RFID tag location relative to a point along a length of a bomb-sniffing dog, wherein a first of the one or more antennas is located proximate to the dog's nose, and a second antenna is located proximate to the dog's tail.

It should be noted that the methods described herein do not have to be executed in the order described, or in any particular order. Moreover, various activities described with respect to the methods identified herein can be executed in repetitive, serial, or parallel fashion. Information, including parameter values, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
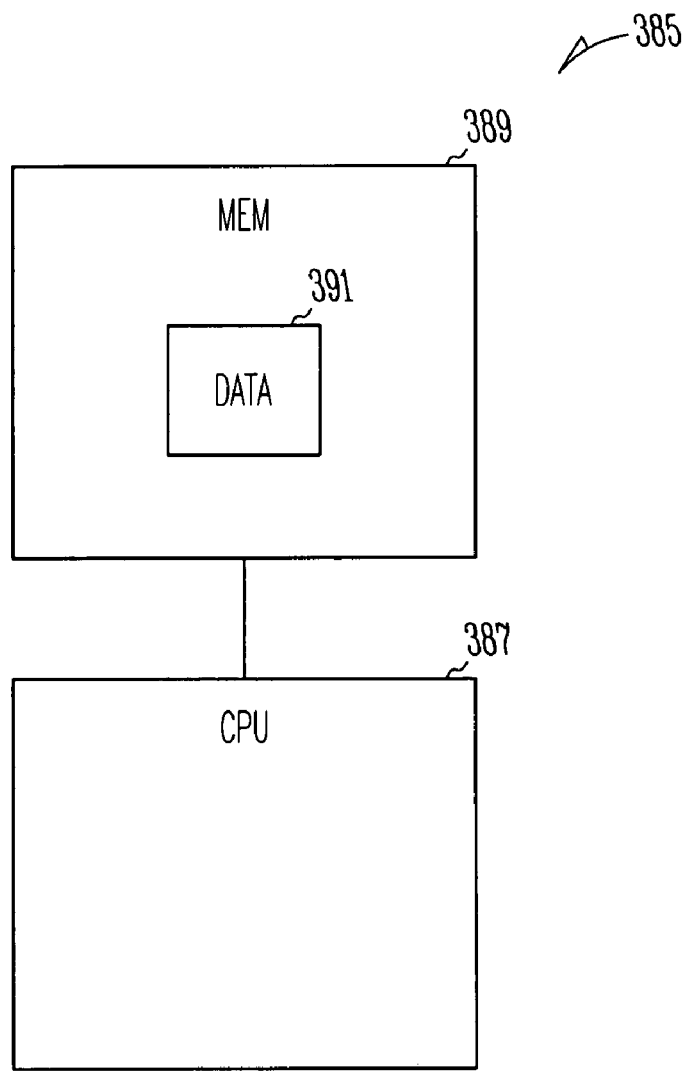
FIG. 3 is a block diagram of an article according to various embodiments of the invention.

For example, FIG. 3 is a block diagram of an article 385 according to various embodiments of the invention. Such embodiments may include a computer, a memory system, a magnetic or optical disk, some other storage device, and/or any type of electronic device or system. The article 385 may include one or more processors 387 coupled to a machine-accessible medium such as a memory 389 (e.g., a memory including an electrical, optical, or electromagnetic conductor) having associated information 391 (e.g., computer program instructions and/or data) which, when accessed, results in a machine (e.g., the one or more processors 387) performing such actions as distinguishing a location of an RFID tag relative to a selected location on a body, including a finger, a thumb, or a palm, for example, using a wearable RFID reader having at least two antennas. Other actions may include distinguishing the selected location on the body during a time when the body is manipulating an object attached to the RFID tag.

Implementing the apparatus, systems, and methods disclosed herein may operate to identify and locate an RFID-tagged object relative to a point on a body including, for example, a human, animal, or robotic body, perhaps while a tagged object is being manipulated. The ability to locate such objects in time and space may lead to a variety of improved capabilities, including protecting humans from danger and analyzing productivity.

Although certain aspects of the inventive concept may be discussed in the exemplary context of an 802.xx implementation (e.g., 802.11a, 802.11g, 802.11 HT, 802.16, etc.), the claims are not so limited. Indeed, embodiments of the present invention may well be implemented as part of any wired and/or wireless system Examples may also include embodiments comprising multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and similar communication systems.

The accompanying drawings that form a part hereof show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
   a wearable radio-frequency identification (RFID) reader; and
   at least two location-resolving antennas coupled to the RFID reader and positioned adjacent to at least one of a finger, a thumb, or a palm to resolve a location of an RFID tag relative to a selected location on a hand.

2. The apparatus of claim 1, wherein the wearable RFID reader is adapted to resolve the location of the RFID tag relative to the selected location to a distance of about 0.25 centimeters to about 25 centimeters along a substantially straight line between the RFID tag location and the selected location.

3. The apparatus of claim 1, further including:
   identification data associated with the RFID tag.

4. The apparatus of claim 3, wherein the wearable RFID reader is adapted to select the identification data at a time prior to a time of reading the RFID tag.

5. The apparatus of claim 1, further including:
   a multiplexer coupled to the RFID reader to select at least one location-resolving antenna from the at least two location-resolving antennas.

6. The apparatus of claim 1, further including:
   a wireless device coupled to the RFID reader to communicate with a data network.

7. The apparatus of claim 6, wherein the wireless device communicates according to an Institute of Electrical and Electronic Engineers (IEEE) 802.11 standard.

8. The apparatus of claim 1, worn by a human to alert a caretaker that the human is within a selected distance of a dangerous, RFID-tagged substance.

9. A system, including:
   a wearable radio-frequency identification (RFID) reader;
   at least two location-resolving antennas coupled to the RFID reader and positioned adjacent to at least one of a finger a thumb, or a palm to resolve a location of an RFID tag relative to a selected location on a hand; and
   a display coupled to the RFID reader.

10. The system of claim 9, wherein the wearable RFID reader is adapted to select a distance-determining resolution along a substantially straight line between the RFID tag location and the selected location using at least one of a transmit power level, a transmit frequency and a phase shift between a transmitted signal and a received signal.

11. The system of claim 9, further including:
a glove for attaching the at least two location-resolving antennas to the hand.

12. A method, including:
resolving at least one location associated with a radio-frequency identification (RFID) tag relative to a selected location on a hand using a wearable RFID reader having at least two location-resolving antennas positioned adjacent to at least one of a finger, a thumb, or a palm.

13. The method of claim 12, further including:
identifying an object attached to the RFID tag according to data stored in the tag.

14. The method of claim 13, further including:
manipulating the object using at least one digit of the hand.

15. The method of claim 12, further including:
transmitting at least one signal from the at least two location-resolving antennas; and
measuring a parameter associated with a return signal from the RFID tag to determine the at least one location associated with the RFID tag.

16. The method of claim 15, wherein the at least one signal comprises a plurality of frequencies.

17. The method of claim 16, wherein selected ones of the plurality of frequencies are transmitted at a frequency of approximately 1 megahertz to approximately 30 gigahertz.

18. The method of claim 15, wherein the parameter associated with the return signal comprises at least one of a signal strength, a phase shift relative to a phase of the at least one transmitted signal, and a spectral component frequency associated with the return signal.

19. The method of claim 15, further including:
selecting at least one of the parameter or a measured value of the parameter to determine a resolution associated with the at least one RFID tag location along a line between the RFID tag location and the selected location on the hand.

20. The method of claim 12, further including:
measuring a time period between sensing a first one of the at least one location associated with the RFID tag and a second one of the at least one location associated with the RFID tag.

21. The method of claim 20, further including:
utilizing a computer to analyze the time period and the at least one location to perform a human productivity time and motion study.

22. The method of claim 21, further including:
utilizing a multi-digit robot to simulate human productivity.

23. The method of claim 20, further including:
employing the time period and the at least one location to monitor patient medical equipment utilization.

24. An article including a machine-accessible medium having associated information, wherein the information, when accessed, results in a machine performing:
resolving at least one location associated with a radio-frequency identification (RFID) tag relative to a selected location on a hand using a wearable RFID reader having at least two location-resolving antennas positioned adjacent to at least one of a finger, a thumb, or a palm.

25. The article of claim 24, wherein the information, when accessed, results in a machine performing:
distinguishing at least one of a finger, a thumb, and a palm operating to manipulate an object attached to the RFID tag.

26. The method of claim 12, further including:
distinguishing at least one of a finger, a thumb, and a palm operating to manipulate an object attached to the RFID tag.

* * * * *

UNITED STATES PATENT AND TRADEMARK OFFICE
CERTIFICATE OF CORRECTION

| | | |
|---|---|---|
| PATENT NO. | : 7,242,293 B2 | Page 1 of 1 |
| APPLICATION NO. | : 11/018570 | |
| DATED | : July 10, 2007 | |
| INVENTOR(S) | : Rea et al. | |

It is certified that error appears in the above-identified patent and that said Letters Patent is hereby corrected as shown below:

Column 6, line 61, in Claim 9, after "finger" isnert -- , --.

Signed and Sealed this

Eleventh Day of September, 2007

JON W. DUDAS
*Director of the United States Patent and Trademark Office*